United States Patent [19]

Kubota et al.

[11] Patent Number: 4,664,452
[45] Date of Patent: May 12, 1987

[54] ELECTRONIC CONTROL SYSTEM FOR AUTOMOTIVE BRAKE SYSTEM FOR CONTROLLING BRAKING PRESSURE DISTRIBUTION IN FRONT AND REAR WHEEL CYLINDERS DEPENDING UPON VEHICULAR LOAD CONDITION

[75] Inventors: Hitoshi Kubota, Minamiashigara; Hideaki Oda, Hamakita, both of Japan

[73] Assignee: Nissan Motor Company, Limited, Kanagawa, Japan

[21] Appl. No.: 760,511

[22] Filed: Jul. 30, 1985

[30] Foreign Application Priority Data

Jul. 31, 1984 [JP] Japan .................. 59-159200

[51] Int. Cl.$^4$ .................. B60T 8/18; B60T 8/30
[52] U.S. Cl. .................. 303/22 R; 303/DIG. 3; 303/6 C
[58] Field of Search ........ 303/22 R, 6 C, 20, DIG. 3, 303/DIG. 4; 188/349, 195

[56] References Cited

U.S. PATENT DOCUMENTS

| | | | |
|---|---|---|---|
| 4,093,316 | 6/1978 | Reinecke | 303/22 R |
| 4,358,163 | 11/1982 | Young | 303/22 R |

FOREIGN PATENT DOCUMENTS

| | | | |
|---|---|---|---|
| 0062246 | 10/1982 | European Pat. Off. | 303/6 C |
| 0047938 | 4/1980 | Japan | 303/22 R |
| 0145053 | 11/1980 | Japan | 188/6 C |
| 0063256 | 4/1984 | Japan | 303/22 R |

Primary Examiner—Duane A. Reger
Assistant Examiner—Alvin Oberley
Attorney, Agent, or Firm—Schwartz, Jeffery, Schwaab, Mack, Blumenthal & Evans

[57] ABSTRACT

A brake control system has a proportioning valve for controlling distribution of fluid pressure to at least rear wheel cylinders with respect to the fluid pressure built-up in a master cylinder. The split point of the proportioning valve is variable depending upon load distribution between front and rear wheels and overall load applied on the vehicle. In order to perform braking pressure distribution control, a controller is provided for setting set pressure for the proportioning valve, which set pressure defining the split point of the proportioning valve. The controller is connected to load sensors monitoring load condition at front part and rear part of the vehicle. The controller received front part load indicative signal and a rear part load indicative signal from the load sensors to derive load distribution and overall load on the vehicle, and whereby derives the set pressure of the proportioning valve. When the actual braking pressure is maintained lower than the set pressure, the controller maintains a proportioning valve device inactive to distribute hydraulic braking pressure built-up by a master cylinder to respective wheel cylinders so that the braking pressure in the wheel cylinders increases at a rate substantially corresponding to increasing rate of the fluid pressure in the master cylinder. On the other hand, when the actual braking pressure becomes equal to or higher than the set pressure, the controller makes the proportioning valve active to distribute the braking pressure to the wheel cylinders so that the braking pressure in the wheel cylinder increases at a controlled rate relative to the pressure increasing in the master cylinder.

11 Claims, 8 Drawing Figures

ELECTRONIC CONTROL SYSTEM FOR AUTOMOTIVE BRAKE SYSTEM FOR CONTROLLING BRAKING PRESSURE DISTRIBUTION IN FRONT AND REAR WHEEL CYLINDERS DEPENDING UPON VEHICULAR LOAD CONDITION

BACKGROUND OF THE INVENTION

The present invention relates generally to an electronic control system for an automotive brake system, which controls hydraulic braking pressure depending upon load condition on a vehicle for preventing vehicular wheels from locking. More specifically, the invention relates to an electronic automotive brake control system which controls proportioning rate of hydraulic pressure in distributing braking pressure built-up in a master cylinder of the brake system.

It should be noted that, throughout the disclosure, the word "load" means physical weight loaded on the vehicle by passanger or passagers riding on a vehicle and/or luggages.

Conventionally, load condition-dependent vehicular brake controls have been developed and proposed in various ways. One of the typical prior art in this field is a linkage type load-sensing proportioning valve disposed within a hydraulic circuit for rear wheel brakes. In such brake control employing the linkage type proportioning valve, a vertical displacement between a vehicle body as sprung mass and a wheel axle as unsprung mass is detected as load indicative parameter. Load corresponding to the magnitude of the detected vertical displacement, is applied to the proportioning valve for varying split point of the hydraulic braking pressure depending upon load condition of the vehicle.

However, such conventional systems could not control braking pressure distribution between front and rear wheels depending upon load distribution on each vehicular wheels.

This defect can be solved by providing variation characteristics of the split point in the proportioning valve so as to adapt braking pressure distribution to load distribution on respective vehicular wheels.

SUMMARY OF THE INVENTION

Therefore, it is an object of the present invention to provide a brake control system which can control braking pressure distribution on each wheel cylinder depending upon load distribution at each vehicular wheel.

Another object of the present invention is to provide a braker control system including a proportioning valve for controlling braking pressure distribution, which has variable split point varying depending upon load distribution at respective vehicular wheels.

In order to accomplish the aforementioned and other objects, a brake control system, according to the present invention, has a proportioning valve for controlling distribusion of fluid pressure to at least rear wheel cylinders with respect to the fluid pressure built-up in a master cylinder. The split point of the proportioning valve is variable depending upon load distribution between front and rear wheels and overall load applied on the vehicle.

In order to perform braking pressure distribution control, a controller is provided for setting set pressure for the proportioning valve, which set pressure defining the split point of the proportioning valve. The controller is connected to load sensors monitoring load condition at front part and rear part of the vehicle. The controller received front part load indicative signal and a rear part load indicative signal from the load sensors to derive load distribution and overall load on the vehicle, and whereby derives the set pressure of the proportioning valve. When the actual braking pressure is maintained lower than the set pressure, the controller maintains a proportioning valve device inactive to distribute hydralic braking pressure built-up by a master cylinder to respective wheel cylinders so that the braking pressure in the wheel cylinders increases at a rate substantially corresponding to increasing rate of the fluid pressure in the master cylinder. On the other hand, when the actual braking pressure becomes equal to or higher than the set pressure, the controller makes the proportioning valve active to distribute the braking pressure to the wheel cylinders so that the braking pressure in the wheel cylinder increases at a controlled rate relative to the pressure increasing in the master cylinder.

According to one aspect of the invention, an automotive brake system comprises a master cylinder building up fluid pressure according to magnitude of manual application of brake, front hydraulic circuit including a front wheel cylinder in which braking pressure is applied, a rear hydraulic circuit including a rear wheel cylinder in which braking pressure in applied, a pressure control valve operative between first position in which fluid pressure built up in the master cylinder is directly derived to the wheel cylinder for increasing the braking pressure substantially corresponding to increasing of the fluid pressure, and a second position in which the fluid pressure built up in the master cylinder is derived for increasing the braking pressure at a controlled rate relative to increasing of the fluid pressure, the pressure control valve varying its positions from the first position to second position in response to the fluid pressure exceeding a set pressure which is set by a set pressure setting means incorporated in the pressure control valve and variable, a first sensor means monitoring overall load applied on the vehicle for outputting a first sensor signal representative of the overall load of the vehicle, a second sensor means monitoring load distribution between front and rear wheels for outputting second sensor signal representative of the load distribution between the front and rear wheels, third sensor means for monitoring the fluid pressure to output a third sensor signal representative fluid pressure, and a controller deriving the set pressure of the pressure control valve on the basis of the first and second sensor signals for producing a control signal for the set pressure setting means to set the set pressure at the value derived on the basis of the first and second sensor signals.

According to another aspect of the invention, an automotive brake system comprises a master cylinder building up fluid pressure according to magnitude of manual application of brake, a front hydraulic circuit including a front wheel cylinder in which braking pressure is appliced, a rear hydraulic circuit including a rear wheel cylinder in which braking pressure is applied, a proportioning valve disposed within the rear hyudraulic circuit for controlling fluid pressure destribution to the rear wheel cylinder for controlling the braking pressure therein, the proportioning valve including means for setting a set pressure defining a split point variable depending on the load condition on the vehicle, a first sensor adapted to monitor load condition at front wheel of the vehicle to produce a first sensor signal representative of the load condition at the front wheel, a second sensor adapted to monitor load condition at rear wheel of the vehicle to produce a second sensor signal representative of the load condition at the rear wheel, a third sensor for monitoring fluid pressure at the inlet of the proportioning valve to produce a third sensor signal having a have representative of the monitored fluid pressure, and a controller deriving an overall load on the vehicle on the basis of the first and second sensor signal values and detecting load distribution on the basis of the first and second sensor signal values for deriving the set pressure of the proportioning valve on the basis of derived overall load and the load distribution between the front wheel and rear wheel, for controlling the set pressure setting means, the controller comparing the set pressure representing valve with the third signal value to maintaine the proportioning valve inoperative for increasing braking pressure in the rear wheel cylinder substantially corresponding to increasing of the fluid pressure in the master cylinder while the third sensor signal value is held smaller than the set pressure representing value, and to activate the proportioning valve for increasing the braking pressure in the rear wheel cylinder at a controlled rate relative to increasing rate of the fluid pressure in the master cylinder when the third sensor signal value increases across the set pressure representing value.

According to a further aspect of the invention, in an automotive brake system with a master cylinder, a wheel cylinder and a braking pressure controlling proportioning valve device disposed between the master cylinder and the wheel cylinder, a method for controlling fluid pressure derivery to the wheel cylinder through the proportioning valve comprises the steps of:
monitoring load distribution between front and rear wheels of the vehicle and producing a load distribution indicative signal having a value representative of load distribution at the front and rear wheels;
monitoring overall load on the vehicle and producing an overall load indicative signal having a value representative of the monitored overall load;
presetting first and second variation characteristics of a set pressure of the proportioning valve, which set pressure defining a split point in brake control operation,
checking the load distribution indicative signal with a reference value representative of a predetermined even load criteria for using the first set pressure variation characteristics in which the set pressure is derived in terms of the overall load indicative signal value when substantial balance of load distribution between the front and rear wheels, and for using the second set pressure variation characteristics in which the set pressure is derived in terms or a rear wheel load indicastive component in the load distribution indicative signal; and
controlling the proportioning valve with variable set pressure, the proportioning valve being maintained inoperative to deriver fluid pressure built up in the master cylinder to the wheel cylinder for increasing braking pressure in the wheel cylinder at substantially corresponding rate to increasing of the fluid pressure in the master cylinder when the fluid pressure is held below the set pressure, and for increasing the braking pressure at a controlled rate with respect to increasing rate of the fluid pressure in the master cylinder when the fluid pressure is equal to or higher than the set pressure.

BRIEF DESCRIPTION OF THE DRAWINGS

The present invention will be understood from the detailed description given herebelow and from the accompanying drawings of the preferred embodiment of the invention, which however, should not be taken to limit the invention to the specific embodiment of the invention, but are for explanation and understanding only.

In the drawings.

DESCRIPTION OF THE PREFERRED EMBODIMENT

Figure 1:
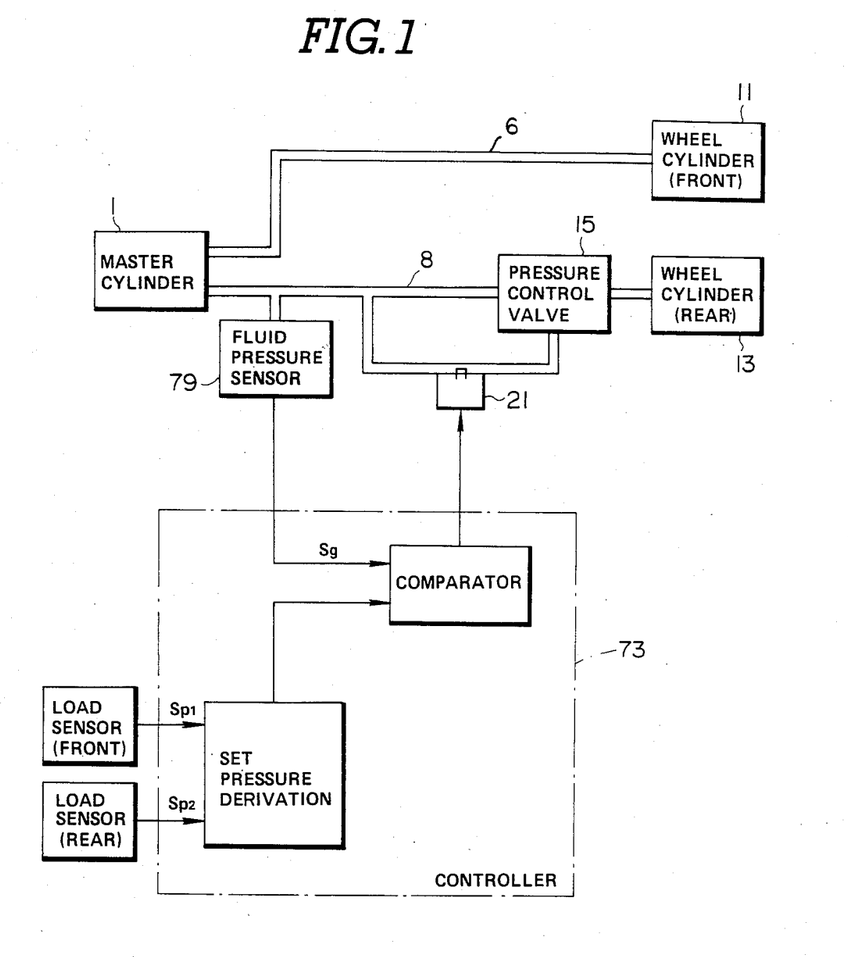
FIG. 1 is a schematic block diagram of the preferred embodiment of an automotive brake control system according to the invention, which illustrates general idea of the invention.
Figure 2:
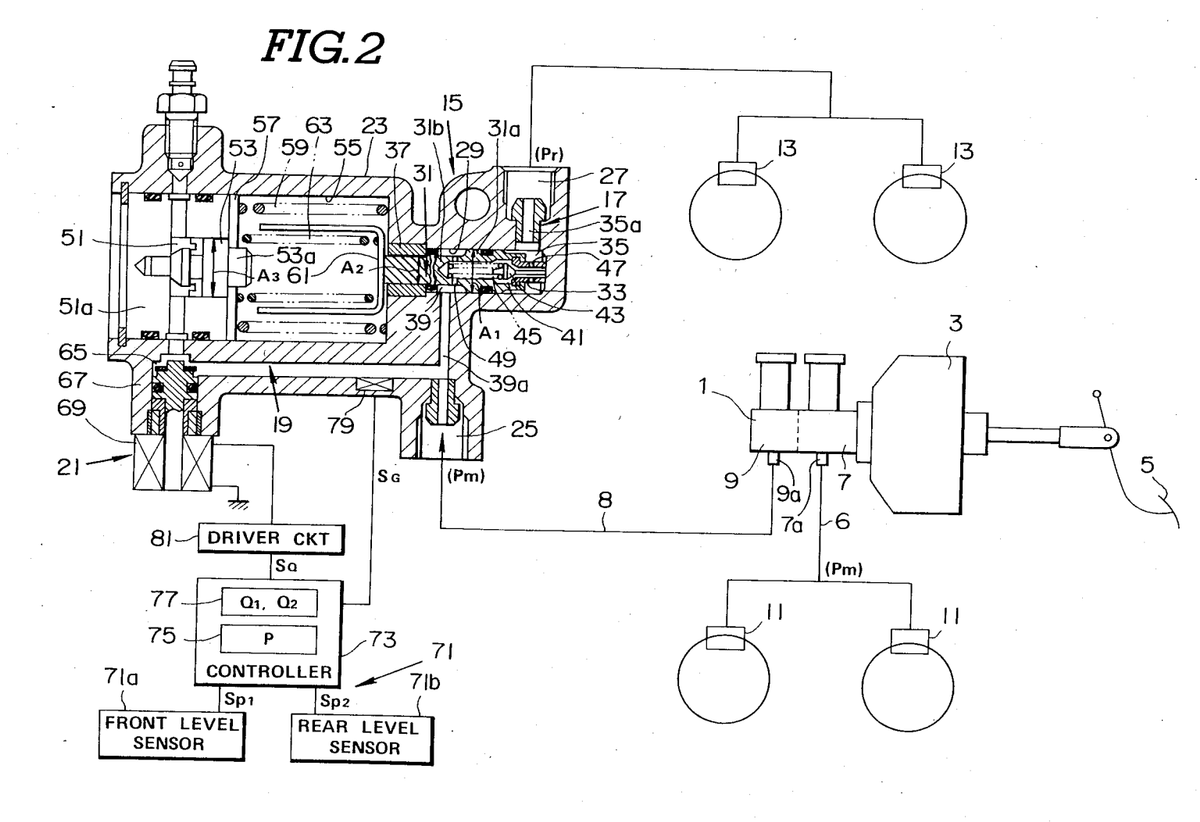
FIG. 2 is a schematic diagramatical illustration showing the preferred embodiment an electronic automotive brake control system according to the present invention.

Referring now to the drawings, particularly to FIGS. 1 and 2 wherein a general idea of the load distribution dependent automotive brake control has been illustrated, the brake control system generally comprises a master cylinder 1 for building up hydraulic fluid pressure according to the magnitude of manual application of a brake application means, such as a brake pedal. The automotive brake control system further comprises a front brake system hydraulic circuit 6 which will be referred to hereafter as "front hydraulic circuit", a rear brake system hydraulic circuit 8 which will be referred to hereafter as "rear hydraulic circuit", front brake system wheel cylinders 11 which will be referred to hereafter as "front wheel cylinder" or "front wheel cylinders", rear brake system wheel cylinders 13 which will be referred to hereafter as "rear wheel cylinder" or "rear wheel cylinders". A proportioning valve 15 is disposed within the rear hydraulic circuit 8 for controlling delivery of fluid pressure to the rear wheel cylinders 13. The proportioning valve 15 is associated with a controller 73 to be set a set pressure defining a split point thereof. The controller 73 is connected to front and rear load sensors 71a and 71b respectively adapted to monitor load conditions at front and rear wheels. The load sensors 71a and 71b may comprise level sensors monitoring relative distance between vehicle body and the corresponding one of front and rear wheels. The controller 73 is also connected to a pressure sensor 79 monitoring fluid pressure output from the master cylinder. The controller 73 derives a set pressure Pi of the proportioning valve 15 on the basis of the load indicative signals from the load sensors 71a and 71b. The controller 73 also performs a comparing operation for comparing the derived set pressure with the master cylinder 1 output pressure to activate the proportioning valve to perform pressure derivery control for the rear wheel cylinders 13 when the master cylinder output pressure becomes equal to or higher than the set pressure.

As shown in FIG. 2, the master cylinder 1 defines therein a primary pressure chamber 7 and a secondary pressure chamber 9. In the shown embodiment, the master cylinder 1 associated with a booster 3 which is, in turn, connected to the brake pedal 5. The master cylinder 1 is cooperative with the booster 3 to build up even hydraulic pressure Pm in both of the primary and secondary pressure chamber 7 and 9 according to magnitude of depression of the brake pedal 5. The master cylinder 1 also has a primary port 7a communicating the primary pressure chamber 7, and a secondary port 9a communicating the secondary chamber 9. The rear hydraulic circuit 8 is connected to the secondary port 9a to connect the secondary pressure chamber 9 to the rear wheel cylinders 13. The front hydraulic circuit 6 is connected to the primary port 7a to connect the primary pressure chamber 7 to the front wheel cylinders 11.

The proportioning valve device 15 has an inlet port 25 connected to the secondary port 9a of the master cylinder 1 and an outlet port 27 connected to the rear wheel cylinders 13. The proportioning valve device 15 comprises a housing 23 enclosing therein a pressure control valve 17 and a solenoid valve 21. The housing 23 also defines a passage 19.

The pressure control valve 17 is adapted to control output pressure Pr to the rear wheel cylinders 13 relative to the input pressure Pm from the master cylinder 1. The pressure control valve 17 thus includes a plunger 31. The plunger 31 has a larger-diameter section 31a to be disposed within a valve chamber 29. The valve chamber 29 has an internal diameter A1. The section 31a of the plunger 31 is slidable with respect to the internal periphery of the valve chamber 29. The plunger 31 also has a smaller-diameter section 31b. The section 31b is slidingly and guidingly supported by a retainer 37 which defines an opening with a diameter A2 smaller than the internal diameter A1 of the valve chamber 29. With the retainer 37 and the section 31b of the plunger 31, a first chamber 39 is defined.

Through the section 31a of the plunger 31, an axially extending valve bore 41 is defined. A valve seat member 33 is secured to the inner periphery of the valve bore 41 adjacent the opening end. A second chamber 35 is defined between the end of the plunger 31 and the bottom wall of the valve chamber 29. The second chamber 35 is in communication with the outlet port 27 via a fluid passage 35a.

A poppet valve 43 is disposed within the valve bore 41. The poppet valve 43 is normally biased toward the valve seat member 33 by means of a spring 45 which is also disposed within the valve bore 41.

The valve bore 41 is connected to the first chamber 39 via a radial passages 49 defined through the smaller diameter section 31b. Valve bore 41 is connected to the annular chamber 35 via a passage 47. The first chamber 39 is in communication with the inlet port 25 via a fluid passage 39a.

The passage 19 is in communication with a pressure accumulator chamber 51 defined in a plug 51a which engages to the housing 23. A pressure responsive piston 53 is disposed within the pressure accumulator chamber 51. The piston 53 separates the pressure accumulator chamber 51 from a bore 55 defined in the housing 23. The piston 53 has a stem 53a extending into the bore 55 and passing through a central opening of a spring seat 57 which loosely and thrustingly engages to the piston stem 53a. A spring 59 is disposed within the bore 55 and adapted to normally bias the piston 53 with the spring seat 57 toward the pressure accumulator chamber 51. The aforementioned plunger 31 opposes the bore 55 at the inner end and has a spring seat member 61. A spring 63 is disposed between the spring seats 57 and 61. The spring 63 is adapted to provide a set pressure for the plunger 31.

The solenoid valve 21 is adapted to block fluid communication through the passage 19 and thus accumulate the input pressure Pm from the master cylinder 1 within the pressure accumulator chamber 51. For this purpose, a valve seat 65 is formed in the housing 23 in opposing relationship to a valve body 67 of the solenoid valve 21. The valve body 67 is operatively associated with a solenoid 69.

In order to monitor relative vertical displacement of the vehicle body and the wheel axle, front and rear level sensors, as the load sensors 71a and 71b are provided in a vehicular suspension. Each of the level sensors 71a and 71b may be any type of sensor suitable for monitoring relative vertical displacement between the vehicle body and the wheel axle. For example, the vehicle level sensor may be as disclosed in U.S. Pat. No. 4,290,044, issued Sept. 15, 1981. The disclosure of the above-identified U.S. Patent is herein incorporated by reference for the sake of disclosure. The level sensor 71a is adapted to monitor relative vertical displacement between the vehicle body and the front wheel axle and produces a level indicative signal $S_{p1}$ which has a value representative of the relative distance between the vehicle body and the front wheel axle. The level sensor 71b is adapted to monitor relative vertical displacement between the vehicle body and the rear wheel axle and produces a level indicative signal $S_{p2}$ which has a value representative of the relative distance between the vehicle body and the rear wheel axle.

Figure 3:
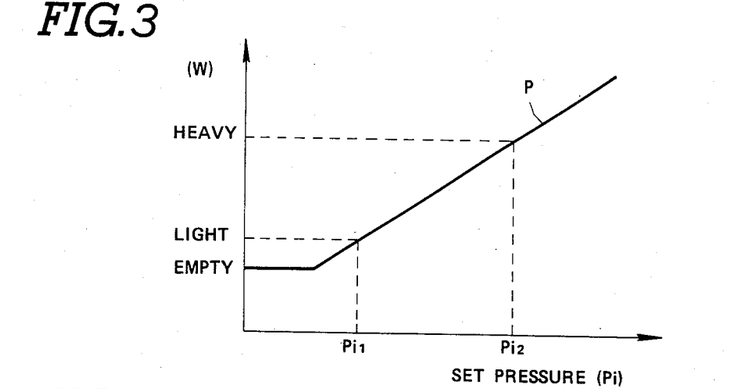
FIG. 3 is a graph showing variation of the set or reference pressure (Pi) in relation to an overall load (W) applied to the vehicle.

The level sensors 71a and 71b are connected to the controller 73 which comprises a microprocessor. The controller 73 is also connected to the pressure sensor 79 which monitors fluid pressure adjacent the inlet port 25 and produces a pressure indicative signal Sg. The microprocessor as the controller 73 has an input interface, CPU, RAM, ROM and output interface. RAM has memory blocks 75 and 77 storing tables of a reference pressure Pi relative to the load distribution between the front and rear wheels and relative to the overall load on the vehicle. The reference pressure or set pressure Pi is variable depending upon the overall load W as shown in FIG. 3. On the other hand, the reference pressure or set pressure Pi varies depending on the load Wb on the rear wheel as shown in FIG. 4.

Figure 4:
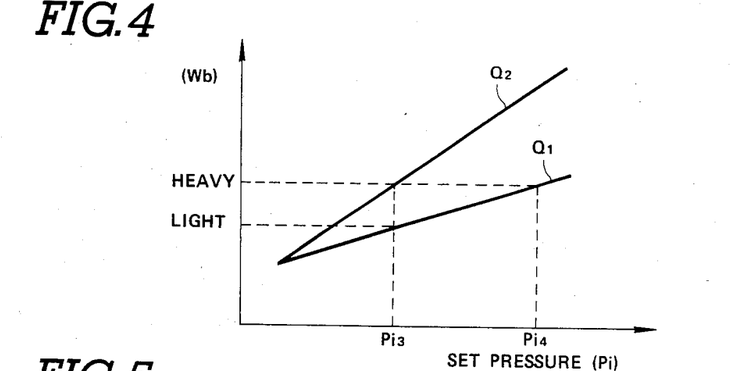
FIG. 4 is a graph showing variation of the set or reference pressure (Pi) in relation to a load (Wb) at rear wheels.

In practice, variation characteristics of the set pressure Pi of FIG. 3 and FIG. 4 are selectively used depending upon load distribution between the front wheel and the rear wheels. For instance, when the load distribution between the front and rear wheels is in a predetermined even load range, in which the load difference between the front and rear wheels is smaller than a given reference value $W_{ref}$, the characteristics of FIG. 3 are used and thus the set pressure is derived on the basis of the overall load on the vehicle. On the other hand, when the load distribution is out of the even load range, in which the load difference between the front and the rear wheels is greater than the reference valve $W_{ref}$, then the characteristics of FIG. 4 are used for deriving the set pressure Pi depending upon the load condition at the rear wheels.

Figure 5:
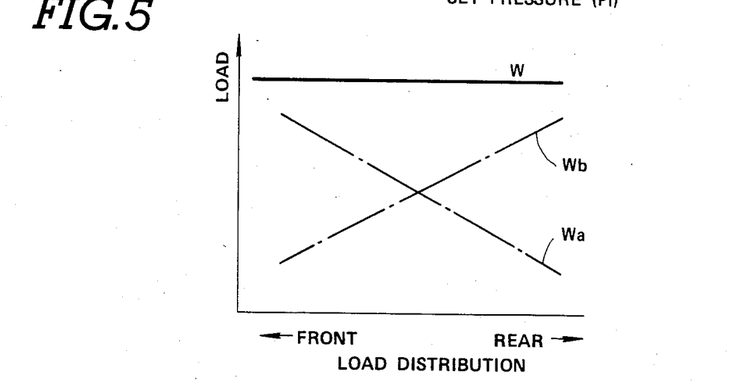
FIG. 5 is an explanatory chart showing load distribution between the front and rear wheels.

As shown in FIG. 5, the load distribution between the front and rear wheels out of the even load range varies into two cases, in one case the front load is greater than the rear load, and in the other case, the rear load is greater than the front load. Depending ont the load balance, two characteristics, i.e. $Q_1$ and $Q_2$ of FIG. 4, are selectively used. The characteristic $Q_1$ is used when the load $W_b$ at the rear wheel is lower than the load $W_a$ at the front wheel. On the other hand, when the load $W_b$ at the rear wheel is greater than the load $W_a$ of the front wheel, the characteristic $Q_2$ is used.

Figure 6:
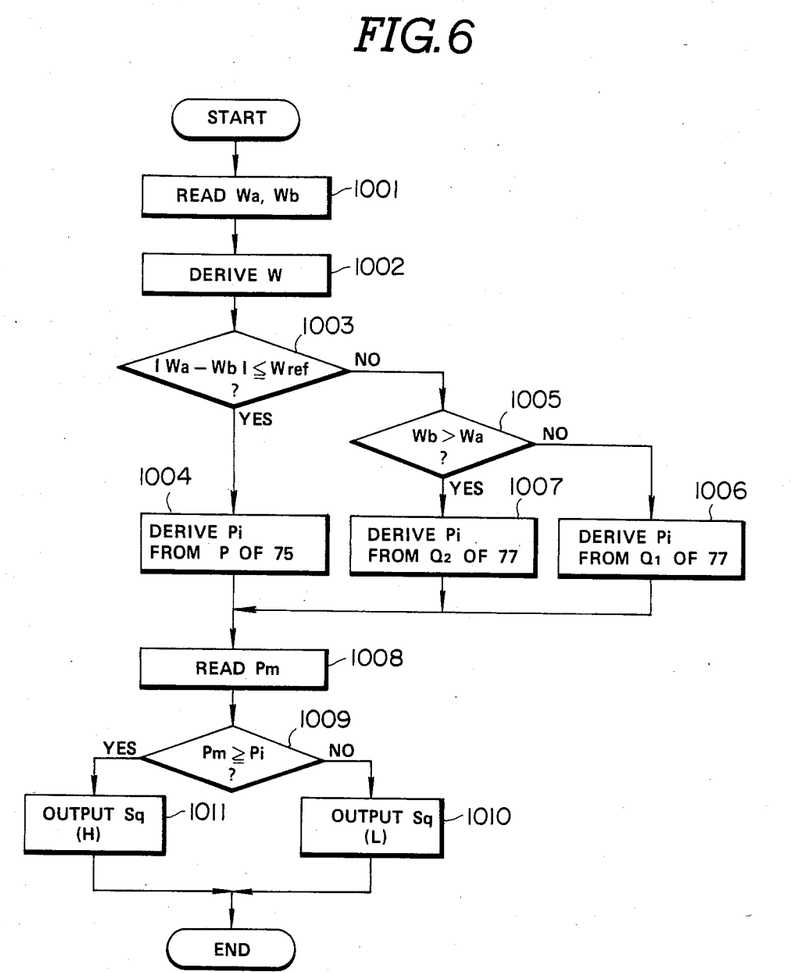
FIG. 6 is a flowchart of a brake control program to be executed by a controller in the control system of FIG. 2.

FIG. 6 shows a proportioning valve control program to be executed by the controller 73 for setting the set pressure Pi for the controlling fluid pressure delivery to the rear wheel cylinders 13. The control program may be triggered in response to application of brake. In order to trigger the control program of FIG. 6, the controller 73 may be connected to a known brake switch which turns ON when the brake pedal 5 is depressed.

At a step 1001, the load condition indicative signals $S_{p1}$ and $S_{p2}$ from the load sensors 71a and 71b are read out. Thereafter, at step 1002, the overall load W is derived on the basis of the load condition indicative signal values which represent front load $W_a$ and the rear load $W_b$. At a step 1003, the front and rear loads $W_a$ and $W_b$ are compared to judge whether the load distribution between the front and rear wheels is in the predetermined even load range. In practice, the absolute value of the difference of the loads at the front and rear wheels is compared with the predetermined reference value $W_{ref}$.

If the absolute value of the difference ($|W_a-W_b|$) of the front and rear wheel loads is equal to or smaller than the reference value $W_{ref}$, set pressure Pi derivation is performed at a step 1004 by looking up the table in the memory block 75 in terms of the overall load W. Therefore, in this case, the set pressure W is derived by utilizing the characteristics of FIG. 3.

On the other hand, when the absolute value of the difference ($|W_a-W_b|$) is greater than the reference value $W_{ref}$ as checked at the step 1003, a check is performed as to whether the load $W_b$ at the rear wheel is greater than the load $W_a$ of the front wheel, at a step 1005. If the rear wheel load $W_b$ is greater than the front wheel load $W_a$, set pressure Pi derivation is performed at a step 1006 by utilizing the characteristic $Q_2$ of FIG. 4. Therefore, table look-up with respect to the table in the memory block 77 is performed in terms of the rear wheel load $W_b$ for the characteristic $Q_2$. When the rear wheel load $W_b$ is smaller than the front wheel load $W_a$ as checked at the step 1005, then set pressure derivation is performed at a step 1007 by utilizing the characteristic $Q_1$ of FIG. 4. Thus, in this case, the set pressure Pi is derived according to the characteristics $Q_1$ of FIG. 4 in terms of the rear wheel load $W_b$.

After the steps 1004, 1006 and 1007, control goes to a step 1008 wherein the fluid pressure indicative signal value $S_g$ is read out. The rear fluid pressure indicative signal value represents the actual fluid pressure adjacent the inlet port 25 of the proportioning valve device 15. The actual fluid pressure Pm is compared with the reference pressure Pi at a step 1009. If the actual fluid pressure Pm is held lower than the reference pressure Pi as checked at the step 1009, then the controller 73 outputs a LOW level control signal Sq to maintain the solenoid inoperative, at a step 1010.

On the other hand, when the actual fluid pressure Pm adjacent the inlet port 25 becomes equal to or higher than the set pressure Pi, the controller 73 outputs a HIGH level control signal to activate the solenoid 69 to shut the passage 19 for blocking fluid communication between the inlet port 25 and the pressure accumulator chamber 51, at a step 1011.

The control signal Sq is fed to a driver circuit 81 which is adapted to control the solenoid 69.

While the driver circuit 81 is in the inoperative condition, the solenoid 69 is maintained in a deactivated position. Therefore, the fluid pressure Pm built up in the master cylinder 1 is transmitted to the rear wheel cylinders 13 through a path formed in the proportioning valve device 15 by the inlet port 25, the fluid passage 39a, first chamber 39, the radial passage 49, the bore 41, the gap between the poppet valve body 43 and the valve seat 33, the second chamber 35 and the outlet port 27. At this time, fluid pressure transmission is performed without reduction of the output pressure at the outlet port 27 relative to the input pressure at the inlet port 25, the fluid pressure serving as hydraulic braking pressure in the rear wheel cylinders substantially corresponds that built up in the master cylinder 1.

At the same time, the front wheel cylinders 11 receive the fluid pressure Pm built up in the primary secondary chamber 9 of the master cylinder 1 in direct manner. Therefore, the hydraulic pressure as the hydraulic braking pressure for the front wheels substantially corresponds to the fluid pressure built up in the master cylinder 1. Consequently, at this time, the front and rear braking pressure is held even.

Figure 7:
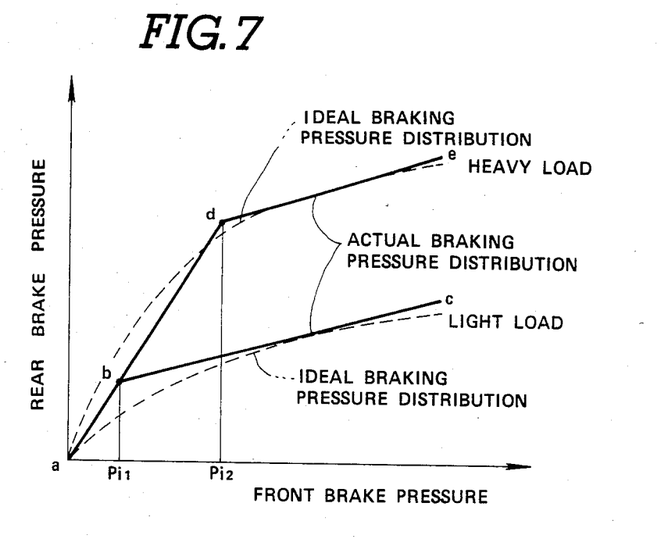
FIGS. 7 and 8 are explanatory charts showing brake control characteristics to be carried out by the brake control system of the present invention.

When the load distribution between the front and rear wheels is in the even load range, and while the actual fluid pressure Pi is held below the set pressure Pi of the proportioning valve device 15, the fluid pressure distribution at the front and rear wheel cylinders increases according to the magnitude of depression of the brake pedal in the region a-b or a-d. The point b and d represents the split points corresponding to the set pressure $Pi_1$ and $Pi_2$ derived according to the characteristics of FIG. 3 in terms of the overall load of the vehicle, as shown in FIG. 7. After the actual fluid pressure Pm exceeds the set pressure $Pi_1$ and $Pi_2$, the fluid pressure balance between the front and rear wheel cylinders varies as shown by lines b-c and d-e.

Figure 8:
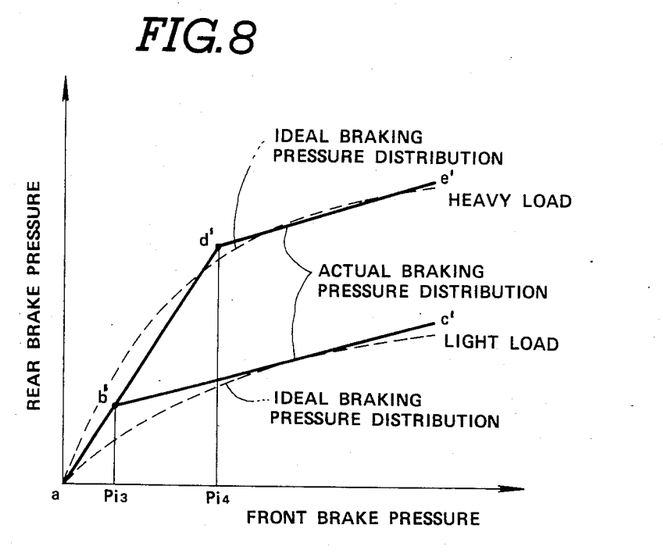

On the other hand, when the load distribution is out of the even load range, the split points b' and d' corresponds to set pressures $Pi_3$ and $Pi_4$ derived according to the characteristics of FIG. 4 in terms of the rear wheel load $W_b$, as shown in FIG. 8.

It should be noted that, in FIGS. 7 and 8, the broken lines show ideal or theoretical braking pressure distribution between the front and rear braking pressure respectively under no load condition and full load condition.

During the period set forth above, the fluid pressure Pm transmitted from the master cylinder 1 is also fed to the pressure accumulator chamber 51 through a fluid path forms in the proportioning valve device 15 by the passage 19.

By depressing the brake pedal 3 to increase the fluid pressure Pm built up in the master cylinder 1 exceeding the set pressure Pi, the control signal Sq for actuating the driver circuit 81 is output from the controller 73. As a result, the solenoid 69 of the solenoid valve 21 is energized. This causes movement of the valve body 67 toward the valve seat 65. The valve body 67 abuts the valve seat 65 to block fluid communication between the pressure accumulator chamber 51 and the inlet port 25 through the passage 19. The accumulated fluid pressure $Pm_1$ in the pressure accumulated chamber 51 serves for pushing the piston 53 toward the bore 55 with compressing of the springs 59 and 63. This increases spring forces of the springs 59 and 63. Therefore, the set pressure for the plunger 31 exerted by means of the spring 63 increases.

By further increasing of the input fluid pressure Pm through the inlet port 25, the fluid pressure in the second chamber 35, Pm, exerted onto the end of larger diameter section 31a of the plunger 31, overcomes the spring force of the spring 63, which corresponds the set pressure Pi. Thus, the plunger 31 moves toward the bore 55 against the spring force of the spring 63. This causes seating of the poppet valve 43 onto the valve seat 33. By this, fluid communication between the inlet port 25 and the outlet port 27 is blocked. When the poppet valve 43 seats, the valve seat 33 blocks fluid communication between the inlet port 25 and the oulet port 27. While the second chamber 35 is blocked from the inlet port 25, the input fluid pressure is increasing and is introduced into the first chamber 39. By increasing of the fluid pressure, the plunger 31 is pushed toward the second chamber 35 to release the poppet valve 43 from the valve seat 33, by abutting the stem of the poppet valve onto the bottom wall the valve chamber 29. This establishes fluid communication between the inlet port 25 and the outlet port 27. By establishing fluid communication between the inlet port 25 and the outlet port 27, the fluid pressure in the second chamber 35 again increases to again cause movement of the plunger 31 toward the bore 55.

By repeating the foregoing thrusting movement of the plunger 31, the braking pressure as output fluid pressure Pr of the proportioning valve device 15 as exceeding the reference pressure Pi, increases at a controlled rate in relation to the increasing rate of the input fluid pressure Pm at the inlet port, as illustrated by line b-c or d-e of FIG. 7 or line b'-c' or d'-e' of FIG. 8. Therefore, as will be appreciated from FIGS. 7 and 8, by the shown embodiment, the braking pressure distribution between the front wheel cylinders 9 and the rear wheel cylinders becomes near the ideal or theoretical pressure distribution.

When the brake pedal 5 is released, the input fluid pressure Pm becomes zero. This causes a pressure difference bretween the pressure accumulator chamber 51 and the inlet port 25. Therefore, the accumulated fluid pressure $Pm_1$ in the pressure accumulator chamber 57 flows through passage 19 with pressing the valve body 67 the inlet port 25 to be drained.

As will be appreciated herefrom, the present invention fulfills all of the objects and advantages sought therefor.

While the invention has been disclosed in terms of the preferred embodiment of the invention, it is not intended to limit the invention to the shown embodiment. The invention should be understood to include all of possible modifications of the shown embodiment and other embodiments to be embodied without departing from the principle as set out in the appended claims.

What is claimed is:

1. An automotive brake system comprising:
   a master cylinder building up fluid pressure according to magnitude of manual application of a brake;
   a front hydraulic circuit including a front wheel cylinder in which braking pressure is applied for controlling a front wheel;
   a rear hydraulic circuit including a rear wheel cylinder in which braking pressure is applied for controlling a rear wheel;
   a pressure control valve operative between first state in which fluid pressure built up in said master cylinder is directly delivered to said wheel cylinder for increasing said braking pressure substantially corresponding to increasing of said fluid pressure, and a second state in which the fluid pressure built up in said master cylinder is delivered for increasing said braking pressure at a controlled rate relative to increasing of said fluid pressure, said pressure control valve varying its state from said first state to second state in response to a control signal;
   overall load derivation means for deriving overall load applied on the vehicle for outputting a first signal representative of the overall load of the vehicle;
   load distribution derivation means for deriving load distribution between said front and rear wheels for outputting a second signal representative of the load distribution between said front and rear wheels;
   pressure sensing means for monitoring said fluid pressure to output a third signal representative fluid pressure; and
   a controller for receiving said first, second and third signals, deriving a set pressure of said pressure control valve on the basis of said first and second signals and producing said control signal which varies the state of said pressure control valve by comparing the value of said third signal with said set pressure.

2. The brake system as set forth in claim 1, wherein said controller causes said control signal to place said pressure control valve in said first state when the value of said third signal is held below said set pressure, and causes said control signal to place said pressure control valve in said second state when the value of said third signal exceeds said set pressure.

3. The brake system as set forth in claim 2, wherein said pressure control valve comprises a hydraulic means normally communicated with said master cylinder for receiving said fluid pressure therefrom, and a pressure setting valve which is electromagnetically operable, said pressure setting valve is responsive to said control signal of said controller for setting said set pressure for latching the instantaneous fluid pressure in said hydraulic means, and means responsive to said latched fluid pressure for increasing said braking pressure at said controlled rate.

4. The brake system as set forth in claim 3, wherein said controller has first and second set pressure variation characteristics for deriving said set pressure of said pressure control valve, said first pressure variation characteristics is used when load distribution between said front and rear is within a predetermined even load range, and said second set pressure varying characteristic is used when said load distribution is out of said even load range.

5. The brake system as set forth in claim 4, wherein said load distribution derivation means comprises a front load sensor monitoring load condition at the front wheel and a rear load sensor for monitoring load condition at the rear wheel, and said controller derives said set pressure by utilizing said first set pressure variation characteristic in terms of said first signal value when a difference between the front and rear loads as monitored by said front and rear load sensors is within said predetermined even load range, and by utilizing said second set pressure variation characteristic in terms of said load condition at the rear wheel as monitored by said rear load sensor when the difference between the front and rear loads is out of said predetermined even load range.

6. An automotive brake system comprising:
a master cylinder building up fluid pressure according to magnitude of manual application of a brake;
a front hydraulic circuit including a front wheel cylinder in which braking pressure is applied;
a rear hydraulic circuit including a rear wheel cylinder in which braking pressure is applied;
a proportioning valve disposed within said rear hydraulic circuit for controlling fluid pressure distribution to said rear wheel cylinder for controlling said braking pressure therein, said proportioning valve including means for setting a set pressure defining a split point variable depending on the load condition on the vehicle;
a first sensor adapted to monitor load condition at said front wheel of the vehicle to produce a first sensor signal representative of the load condition at the front wheel;
a second sensor adapted to monitor load condition at said rear wheel of the vehicle to produce a second sensor signal representative of the load condition at the rear wheel;
a third sensor for monitoring fluid pressure at the inlet of said proportioning valve to produce a third sensor signal representative of the monitored fluid pressure; and
a controller deriving an overall load on the vehicle on the basis of said first and second sensor signal values, detecting load distribution on the basis of said first and second sensor signal values and deriving a set pressure representing value of said proportioning valve on the basis of said overall load and said load distribution between said front wheel and rear wheel, for controlling said set pressure setting means, said controller comparing said set pressure representing value with said third signal value, and producing a control signal which maintains said proportioning valve such that the braking pressure in said rear wheel cylinder increases substantially corresponding to increasing of said fluid pressure in said master cylinder while said third sensor signal value is held smaller than said set pressure representing value and maintains said proportioning valve such that the braking pressure in said rear wheel cylinder increases at a controlled rate relative to the increasing rate of said fluid pressure in said master cylinder when said third sensor signal value increases across said set pressure representing value.

7. The brake system as set forth in claim 6, wherein said set pressure setting means comprises a hydraulic means normally communicated with said master cylinder for receiving said fluid pressure therefrom, and a pressure setting valve which is electromagnetically operable, said pressure setting valve is responsive to a control signal of said controller for setting said set pressure for latching the instantaneous fluid pressure in said hydraulic means, and means responsive to said latched fluid pressure for increasing said braking pressure at said controlled rate.

8. The brake system as set forth in claim 7, wherein said controller has first and second set pressure variation characteristics for deriving said set pressure of said pressure control valve, said first pressure variation characteristic is used when the load distribution between said front and rear wheels is within a predetermined even load range, and said second set pressure variation characteristics is used when said load distribution is out of said even load range.

9. In an automotive brake system with a master cylinder, a wheel cylinder and a braking pressure control valve disposed between said master cylinder and said wheel cylinder, a method for controlling fluid pressure delivery to said wheel cylinder through said pressure control valve comprising the steps of:
monitoring load distribution between front and rear wheels of the vehicle and producing a load distribution indicative signal having a value representative of the load distribution at said front and rear wheels;
monitoring overall load on the vehicle and producing an overall load indicative signal having a value representative of the overall load;
presetting first and second variation characteristics of a set pressure of said pressure control valve, which set pressure defining a split point in brake control operation;
checking said load distribution indicative signal with a reference value representative of a predetermined even load criterion for using said first set pressure variation characteristic in which said set pressure is derived in terms of said overall load indicative signal value when there is substantial balance of load distribution between said front and rear wheels, and for using said second set pressure variation characteristic in which said set pressure is derived in terms of a rear wheel load indicative component in said load distribution indicative signal when said load distribution is out of balance; and
controlling said pressure control valve with variable set pressure, said pressure control valve being maintained in a condition to deliver fluid pressure built up in said master cylinder to said wheel cylinder for increasing braking pressure in said wheel cylinder at a rate substantially corresponding to increasing of said fluid pressure in said master cylinder when the fluid pressure is held below said set pressure, and for increasing said braking pressure at a controlled rate with respect to an increasing rate of the fluid pressure in said master cylinder when the fluid pressure is equal to or higher than said set pressure.

10. The method as set forth in claim 9, in which monitoring of said load distribution is performed by monitoring load at front wheel and load at the rear wheel separately for forming said load distribution indicative signal comprising a front wheel load indicative component and said rear wheel load indicative component.

11. The method as set forth in claim 10, which further comprises steps of prividing a reference pressure chamber in said pressure control valve, which reference pressure chamber is normally in communication with said master cylinder to receive fluid pressure built up therein, monitoring fluid pressure output from said master cylinder to produce a fluid pressure indicative signal having a value representative of the fluid pressure, and blocking fluid communication between said reference pressure chamber and said master cylinder for holding fluid pressure in said reference pressure chamber at the level corresponding to said set pressure when the fluid pressure output from said master cylinder becomes equal to or greater than said set pressure.

* * * * *